3,537,988
HYPERFILTRATION METHOD OF REMOVING ORGANIC SOLUTE FROM AQUEOUS SOLUTIONS
Arthur E. Marcinkowsky, Charleston, W. Va., and James S. Johnson and Kurt A. Kraus, Oak Ridge, Tenn., and James R. Kuppers, Charlotte, N.C., assignors to the United States of America as represented by the United States Atomic Energy Commission
No Drawing. Filed Feb. 7, 1968, Ser. No. 703,521
Int. Cl. B01d *13/00*
U.S. Cl. 210—23          5 Claims

ABSTRACT OF THE DISCLOSURE

A method of removing organic solute from an aqueous solution comprising passing said solution over a dynamic hyperfiltration membrane under conditions whereby a portion of said solution is forced through said membrane, the portion passing through said membrane being depleted in said organic solute.

BACKGROUND OF THE INVENTION

The invention described herein was made in the course of, or under, a contract with the United States Atomic Energy Commission and in the course of work performed for the Office of Saline Water of the United States Department of the Interior.

Our invention relates to methods of removing organic solutes from aqueous solutions.

SUMMARY OF THE INVENTION

It is one object of our invention to provide a simple method for removing organic solutes from water.

It is another object to provide a method of treating industrial and sewage wastes.

Other objects of our invention will become apparent from the following description and claims.

We have discovered that organic solutes in an aqueous solution are rejected by dynamically formed hyperfiltration membranes and in accordance with our invention we have provided a method of decreasing the concentration of an organic solute in an aqueous solution containing said solute comprising establishing a dynamic membrane on a porous substrate and moving said aqueous phase past said substrate under conditions whereby a portion of said aqueous phase passes through said porous substrate and said membrane, the portion passing through being depleted in said solute.

Organic solutes having a wide range of molecular weights and containing a wide variety of substituents can be removed from an aqueous solution by our method. Some organic substances are capable of forming a self-rejecting membrane and therefore do not require the addition of a membrane-forming material to the feed solution.

DESCRIPTION OF THE PREFERRED EMBODIMENTS

Our invention is carried out by establishing a dynamic membrane on a porous substrate and then passing an aqueous solution containing the organic solute to be removed over the porous substrate under conditions whereby a portion of said aqueous solution passes through said membrane.

As is disclosed in co-pending application Ser. No. 504,277, filed Oct. 23, 1965, now Pat. No. 3,449,245, for "A Salt-Rejecting Barrier," a dynamic salt-rejecting membrane may be formed by passing an aqueous phase containing a dispersible material through a porous substrate while maintaining flow parallel to its surface. The resulting rejecting membrane is extremely thin, i.e., in the range of 1 to 30 microns thick, and consequently fluids can be forced through it at a relatively high rate at moderate pressures.

The substrate may be of any material capable of maintaining its integrity under the pressures involved and in the presence of the aqueous solution to be treated. The chemical nature of the substrate is not significant and materials of such widely diverse natures as metal filters, porcelain frits, glass frits, porous carbon, and organic materials such as permeable papers may be used.

The diameter of the pores in the substrate may range from about 30 A. to 5 microns and in circumstances where the membrane-forming additive contains colloidal material the maximum diameter may be several times as large.

The membrane-forming additives may be selected from a wide variety of substances including neutral organic polymers, polyelectrolytes, organic ion exchanges, inorganic ion exchangers and hydrous metal oxides. The additives disclosed in application Ser. No. 504,277 as useful in forming a salt-rejecting membrane are also useful in forming a membrane for rejecting organic solutes.

Our process is capable of reducing the concentration in an aqueous solution of a wide variety of organic materials over a wide range of molecular weights. The rejection in general increases with an increase in molecular weight, thus making possible the fractionation of organic materials.

Our process removes organic constituents found in industrial wastes, and sewage effluents. Typical of the organic compounds which can be rejected by a dynamic membrane are alcohols, sugars, and lignosulfonic acids.

The pressure used in forcing the aqueous solution through the membrane must be greater than the difference in the osmotic pressure between the permeating and feed solutions. Pressures of at least 50 pounds per square inch are desirable and pressures as high as several thousand pounds per square inch may be needed to attain the lowest cost for removing solute.

The degree of concentration change in a single pass through the membrane is influenced by the species of solute present, the concentration of the solute, the size of the pores in the substrate, the pressure used to force liquid through the membrane and the rate of flow of liquid parallel to the membrane surface. In carrying out our process the concentration of solute at the membrane must not be permitted to increase excessively over that of the feed solution. Concentration polarization and its attendant increase in the concentration of solute in the solution passing through the membrane can be minimized by circulating the feed solution past the membrane at a rate high enough to maintain the concentration of solute at the membrane near the concentration of solution in the feed solution or by use of means to promote turbulence.

Having thus described our invention the following examples are offered to illustrate it in more detail.

EXAMPLE I

A permeable substrate was made by cutting disks from a 40-micron thick silver filter having a nominal pore diameter of 0.2 micron. These disks were supported by a grossly porous metal frit and mounted in apparatus adapted to circulate at high pressure a solution over the disks. A hyperfiltration membrane was formed on this substrate by passing an aqueous phase containing $10^{-3}$ molar colloidal Zr(IV) hydrous oxide through it. A feed solution containing 50 grams per liter of n-butanol and $10^{-4}$ molar in colloidal Zr(IV) hydrous oxide was then circulated past the filter at a pressure of 105 atmospheres. The permeation rate was 140 gallons per day per square foot (g.p.d./ft.$^2$) and the rejection value of butanol was 47 percent.

As can be seen from Example I a dynamic permeable membrane is capable of rejecting n-butanol.

EXAMPLE II

Feed solutions containing other organic materials were processed in a manner similar to the feed solution of Example I. The resulting data are given in the following table.

TABLE.—REJECTION OF ORGANIC SOLUTES

| Organic solute | Concentration, g./l. | Pressure, atm. | Membrane[a] | Permeation, g.p.d./ft.$^2$ | Observed rejection, percent |
|---|---|---|---|---|---|
| Methanol | 15 | 31 | A | 91 | 5 |
|  | 50 | 34 | B | 35 | 9 |
|  | 50 | 34 | C | 24 | 6 |
| Ethanol | 50 | 34 | B | 38 | 12 |
|  | 50 | 34 | C | 31 | 7 |
| n-Butanol | 50 | 41 | A | 45 | 19 |
|  | 50 | 34 | B | 31 | 19 |
|  | 50 | 34 | C | 18 | 19 |
|  | 50 | 34 | C | 28 | 10 |
| 2-butanone | 50 | 38 | A | 47 | 16 |
|  | 50 | 34 | B | 42 | 30 |
|  | 50 | 34 | C | 24 | 24 |
|  | 50 | 34 | C | 28 | 27 |
| Phenol | 47 | 40 | A | 82 | 11 |
|  | 50 | 34 | B | 35 | 26–56 |
|  | 50 | 34 | C | 18 | 42–47 |
|  | 50 | 34 | C | 21 | 44 |
| Sucrose | 100 |  |  | 18 | 43 |
|  | 25 |  |  | 24 | 43 |
|  | 50 |  |  | 24 | 43 |
| EG [b] | 15 | 35 | A | 60 | 23 |
| DEG [b] | 25 | 35 | A | 60 | 26 |
| TEG [b] | 40 | 35 | A | 60 | 28 |
| PEG-300 [b] | 50 | 35 | A | 47 | 52 |
| PEG-600 [b] | 50 | 35 | A | 49 | 70 |
| PEG-1000 [b] | 50 | 35 | A | 45 | 85 |
| PEG-4000 [b] | 50 | 30 | A | 38 | 91 |
| PEG-6000 [b] | 50 | 35 | A | 38 | 89 |

[a] See the following table:

| Membrane | Support | Pore diameter, microns (nominal) | Molarity, colloidal hydrous Zr(IV) oxide in feed |
|---|---|---|---|
| A | Silver | 0.2 | 10$^{-4}$ |
| B | Vinyl | 0.45 | 10$^{-5}$ |
| C | Carbon | 0.3 | 10$^{-5}$ |

[b] EG=Ethylene glycol; DEG=Diethylene glycol; TEG=Triethylene glycol; PEG=Polyethylene glycol. The numbers are an index giving a relative order of average molecular weights.

As can be seen from Example II our method is capable of reducing the concentration of a variety of organic solutes in an aqueous solution.

EXAMPLE III

An aqueous solution containing 1 percent of a paper mill waste, primarily lignosulfonic acids, was circulated through a porous carbon tube (0.3 micron nominal pore diameter) at a pressure of 400 pounds per square inch. Within thirty minutes the flow rate through the walls was 90 g.p.d./ft.$^2$ and 80 percent of the coloring matter was removed as determined spectrophotometrically.

This example demonstrates the ability of the organic materials in a paper mill waste to form a self-rejecting membrane.

EXAMPLE IV

The feed solution of Example III was made 10$^{-3}$ molar in colloidal hydrous zirconium oxide and pumped through the same carbon tube. Rejection of the coloring matter increased to about 95 percent with a flow rate through the tube walls of about 50 g.p.d./ft.$^2$.

EXAMPLE V

The secondary effluent from a sewage plant was introduced into a hyperfiltration unit containing a porcelain filter tube. The average flow rate through the filter walls was 50 g.p.d./ft.$^2$ and the rejection of organic material in terms of chemical oxygen demand was 90 percent.

EXAMPLE VI

Water from a lake containing pollutants was treated by introducing it into a hyperfiltration unit containing a porcelain filter tube. The flow rate through the walls decreased with time from about 100 g.p.d./ft.$^2$ to 30 g.p.d./ft.$^2$. The rejection of organic matter in terms of chemical oxygen demand was 64 to 92 percent.

Examples V and VI show the removal of pollutants from waters using our technique.

The foregoing examples are intended to illustrate, not to limit our invention. It is obvious that changes may be made in the substrate and the membrane-forming materials and that a wide variety of organic materials can be removed from aqueous solutions by our method.

We claim:

1. A method for decreasing the organic solute concentration contained in an aqueous phase in which said aqueous phase consists of at least one membrane-forming material selected from the group consisting of synthetic neutral organic polymers, polyelectrolytes, organic ion exchangers, inorganic ion exchangers, polyvalent metal salts capable of hydrolysis to form hydrous metal oxides having ion exchange properties, as well as other extraneous organic materials, comprising the steps of:
   (a) passing said aqueous phase past a porous substrate to establish a dynamic hyperfiltration membrane on said substrate and
   (b) continuing to pass said aqueous phase past the dynamically established membrane at a pressure which permits permeation of the aqueous phase through the membrane and substrate to yield an aqueous solution depleted in organic content relative to that contained in the unpermeated aqueous phase.

2. The method according to claim 1 in which a first feed solution containing the selected membrane-forming material is flowed past a porous substrate to cause formation of the membrane followed by the step of passing a second feed containing extraneous organic materials past the thus formed dynamic membrane to effect permeation of said second feed through said membrane to yield an aqueous solution depleted in organic content.

3. The method of claim 1 wherein said organic solute is selected from the group consisting of alcohols, sugars, and lignosulfonic acids.

4. The method of claim 1 wherein said aqueous phase comprises a paper mill waste.

5. The method of claim 1 wherein said aqueous phase comprises a sewage effluent.

References Cited

UNITED STATES PATENTS

| 3,170,867 | 2/1965 | Loeb et al. | 210—500 X |
| 3,228,876 | 1/1966 | Mahon | 210—321 X |
| 3,373,056 | 3/1968 | Martin | 210—23 X |
| 3,310,488 | 3/1967 | Loeb et al. | 210—22 |
| 3,331,772 | 7/1967 | Brownscombe et al. | 210—23 |
| 3,344,928 | 10/1967 | Kraus et al. | 210—23 X |
| 3,367,787 | 2/1968 | Thijssen et al. | 99—199 |
| 3,373,056 | 3/1968 | Martin | 210—23 X |
| 3,449,245 | 6/1969 | Johnson et al. | 210—23 |
| 3,462,362 | 8/1969 | Kollsman | 210—23 |

OTHER REFERENCES

"Self-Repairing Membranes Hold Promise in Desalting Brackish Water," from Chem. and Eng. News, Dec. 19, 1966, p. 47 relied on.

"The Oak Ridge National Laboratory, Oak Ridge, Tenn., Has Developed A . . .," from Desalting Digest, vol. 4, No. 10, received in Patent Office Dec. 14, 1966, 6 pp., pp. 4 and 5 relied on, published by Industry Reports, Inc., 514 10th St., NW., Washington, D.C.

FRANK A. SPEAR, JR., Primary Examiner

U.S. Cl. X.R.

210—321